(12) United States Patent
Ono et al.

(10) Patent No.: US 10,698,208 B2
(45) Date of Patent: Jun. 30, 2020

(54) DISPLAY DEVICE AND INFRARED LIGHT-CUTTING FILM

(71) Applicant: 3M INNOVATIVE PROPERTIES COMPANY, St. Paul, MN (US)

(72) Inventors: Atsushi Ono, Tokyo (JP); Noboru Iwata, Tokyo (JP); Yuji Saito, Kanagawa (JP); Kentaro Tamura, Kanagawa (JP)

(73) Assignee: 3M Innovative Properties Company, St. Paul, MN (US)

( * ) Notice: Subject to any disclaimer, the term of this patent is extended or adjusted under 35 U.S.C. 154(b) by 113 days.

(21) Appl. No.: 16/074,823

(22) PCT Filed: Jan. 30, 2017

(86) PCT No.: PCT/US2017/015615
§ 371 (c)(1),
(2) Date: Aug. 2, 2018

(87) PCT Pub. No.: WO2017/136272
PCT Pub. Date: Aug. 10, 2017

(65) Prior Publication Data
US 2019/0041638 A1 Feb. 7, 2019

(30) Foreign Application Priority Data
Feb. 3, 2016 (JP) ................. 2016-018699

(51) Int. Cl.
*G02B 5/30* (2006.01)
*G02B 27/01* (2006.01)
(Continued)

(52) U.S. Cl.
CPC .......... *G02B 27/0101* (2013.01); *B32B 27/08* (2013.01); *G02B 5/208* (2013.01);
(Continued)

(58) Field of Classification Search
CPC ................ B32B 27/08; B32B 2307/42; B32B 2457/202; G02B 1/115; G02B 27/0101;
(Continued)

(56) References Cited

U.S. PATENT DOCUMENTS

| 6,049,419 A | 4/2000 | Wheatley |
| 6,179,948 B1 * | 1/2001 | Merrill .................. B29C 55/023 156/160 |

(Continued)

FOREIGN PATENT DOCUMENTS

| JP | 11023997 | 1/1999 |
| JP | 2002022954 | 1/2002 |

(Continued)

OTHER PUBLICATIONS

International Search Report for PCT International Application No. PCT/US2017/015615, dated Apr. 20, 2017, 5 pages.

*Primary Examiner* — Balram T Parbadia
(74) *Attorney, Agent, or Firm* — Robert S. Moshrefzadeh

(57) ABSTRACT

The display device according to an embodiment of the present invention comprises: a display unit (20) emitting visible light (L2) of linearly polarized waves having display information, an infrared light-cutting section (30) transmitting the visible light (L2) from the display unit (20) and reducing an incident quantity of infrared light on the display unit (20), and a reflecting section (40) reflecting visible light (L3) transmitted through the infrared light-cutting section (30); the infrared light-cutting section (30) comprising a first polymer film (31) and a second polymer film (32) disposed on the first polymer film (31), the first polymer film (31) and the second polymer film (32) both having anisotropy of refractive indices and having a first axis (Ax1) having a highest of the refractive indices, the first axis (Ax1) of the (Continued)

first polymer film (31) and the first axis (Ax1) of the second polymer film (32) intersecting in a planar view.

5 Claims, 5 Drawing Sheets

(51) Int. Cl.
  *B32B 27/08* (2006.01)
  *G02B 5/28* (2006.01)
  *G02B 5/20* (2006.01)
  *G01C 21/36* (2006.01)

(52) U.S. Cl.
  CPC .............. *G02B 5/281* (2013.01); *G02B 5/305* (2013.01); *G02B 5/3083* (2013.01); *B32B 2307/42* (2013.01); *B32B 2457/202* (2013.01); *G01C 21/365* (2013.01); *G02B 2027/0118* (2013.01)

(58) Field of Classification Search
  CPC ........ G02B 5/208; G02B 5/281; G02B 5/282; G02B 5/305; G02B 5/3083; G02B 2027/0118; G02B 5/28; G02B 5/30; G01C 21/365
  See application file for complete search history.

(56) References Cited

U.S. PATENT DOCUMENTS

| | | | |
|---|---|---|---|
| 6,207,260 B1* | 3/2001 | Wheatley | G02B 5/282 428/212 |
| 6,804,058 B1* | 10/2004 | Ouderkirk | B29C 55/023 359/489.12 |
| 7,852,560 B2 | 12/2010 | Ouderkirk et al. | |
| 2002/0031676 A1 | 3/2002 | Jonza | |
| 2004/0004778 A1* | 1/2004 | Liu | B32B 17/10862 359/883 |
| 2004/0032658 A1 | 2/2004 | Fleming | |
| 2006/0154049 A1* | 7/2006 | Padiyath | B32B 17/10018 428/328 |
| 2009/0146946 A1 | 6/2009 | Takama | |
| 2014/0177040 A1 | 6/2014 | Uehara | |

FOREIGN PATENT DOCUMENTS

| | | |
|---|---|---|
| JP | 2008132611 | 6/2008 |
| WO | WO 1999-39224 | 8/1999 |

\* cited by examiner

DISPLAY DEVICE AND INFRARED LIGHT-CUTTING FILM

TECHNICAL FIELD

The present invention relates to a display device and an infrared light-cutting film.

BACKGROUND ART

As a heads-up display for vehicles which is a type of display device, for example, a liquid crystal panel having display information is disposed inside the instrument panel in the vehicle interior and light from a backlight transmitted through the liquid crystal panel is emitted toward the front windshield by a reflecting mirror. This emitted light is incident on the eyes of the driver after being reflected by the front windshield, and the driver can see the display information from the liquid crystal panel as a virtual image. In a vehicle, it is important to reduce the effect of thermal energy on the liquid crystal panel due to infrared rays (infrared light) in external light (sunlight).

Japanese Unexamined Patent Application Publication No. H11-23997A discloses a heads-up display for vehicles in which a filter is provided in front of the liquid crystal panel to block infrared light incident on the liquid crystal panel.

SUMMARY OF INVENTION

In the filter described in the above-described Patent Document, transmittance is high in the wavelength range of visible light (the wavelength range of approximately 350 nm to 650 nm), and is zero in the wavelength range of infrared light (the wavelength range of 700 nm and higher). However, when the filter contains a stretched polymer film for example, anisotropy of the refractive indices of the filter arises and it exhibits birefringence. For this reason, when visible light of linearly polarized waves having display information emitted from a display unit containing a liquid crystal panel or the like is transmitted through the filter, it may change from linearly polarized waves to elliptically polarized waves. When the visible light of elliptically polarized waves is reflected by a front windshield, the reflectance of the visible light changes according to the polarized wave component, and therefore, the display information perceived by the driver may degrade in visibility as it differs from the display information that was emitted from the display unit. Further improvement of the filter is necessary in order to block infrared light incident on the display unit while maintaining visibility to the driver. A display device according to an aspect of the present invention is a display device including a display unit emitting visible light of linearly polarized waves having display information, an infrared light-cutting section transmitting the visible light from the display unit and reducing an incident quantity of infrared light on the display unit, and a reflecting section reflecting visible light transmitted through the infrared light-cutting section; the infrared light-cutting section including a first polymer film and a second polymer film disposed on the first polymer film, the first polymer film and the second polymer film both having anisotropy of refractive indices and having a first axis having a highest of the refractive indices, the first axis of the first polymer film and the first axis of the second polymer film intersecting in a planar view.

According to this aspect, because at least one of the first polymer film and the second polymer film contained in the infrared light-cutting section reduces the incident quantity of infrared light on the display unit, the effect of thermal energy on the display unit due to light on the exterior of the display device, such as infrared light in sunlight, is reduced.

Furthermore, because the infrared light-cutting section transmits visible light which has display information, brightness of the display information is retained. Additionally, the first axis of the first polymer film contained in the infrared light-cutting section intersects the first axis of the second polymer film. For this reason, even if the first polymer film having anisotropy of refractive indices exhibits birefringence, that birefringence is generally compensated for by the second polymer film disposed on the first polymer film. Consequently, when visible light emitted from the display unit is transmitted through the infrared light-cutting section, the visible light greatly decreases the proportion changed from linearly polarized waves to elliptically polarized waves. As a result, visible light of elliptically polarized waves is reflected by a reflecting section such as a front windshield, and even if reflectance changes according to the polarized wave component, the proportion of elliptically polarized waves in the visible light transmitted through the infrared light-cutting section is small, and as a result, the display information perceived by the driver resembles the display information emitted from the display unit.

In a display device according to another aspect, the first polymer film and the second polymer film may both contain a multilayer polymer film.

In a display device according to another aspect, an intersection angle between the first axis of the first polymer film and the first axis of the second polymer film may be from 45 to 90 degrees.

In a display device according to another aspect, the infrared light-cutting section includes an infrared light-cutting layer laminated on at least one of the first polymer film and the second polymer film, and the layer reduces the transmitted quantity of infrared light.

Furthermore, the infrared light-cutting film according to one aspect of the present invention is an infrared light-cutting film which transmits visible light from one face and reduces an incident quantity of infrared light from another face, the film including a first polymer film having anisotropy of refractive indices and a second polymer film having anisotropy of refractive indices and disposed on the first polymer film, wherein the first polymer film and the second polymer film both have a first axis having a highest of the refractive indices, and the first axis of the first polymer film and the first axis of the second polymer film intersect in a planar view.

According to one aspect of the present invention, an incident quantity of infrared light on a display unit is easily reduced while visibility of display information is maintained.

DESCRIPTION

Figure 1:
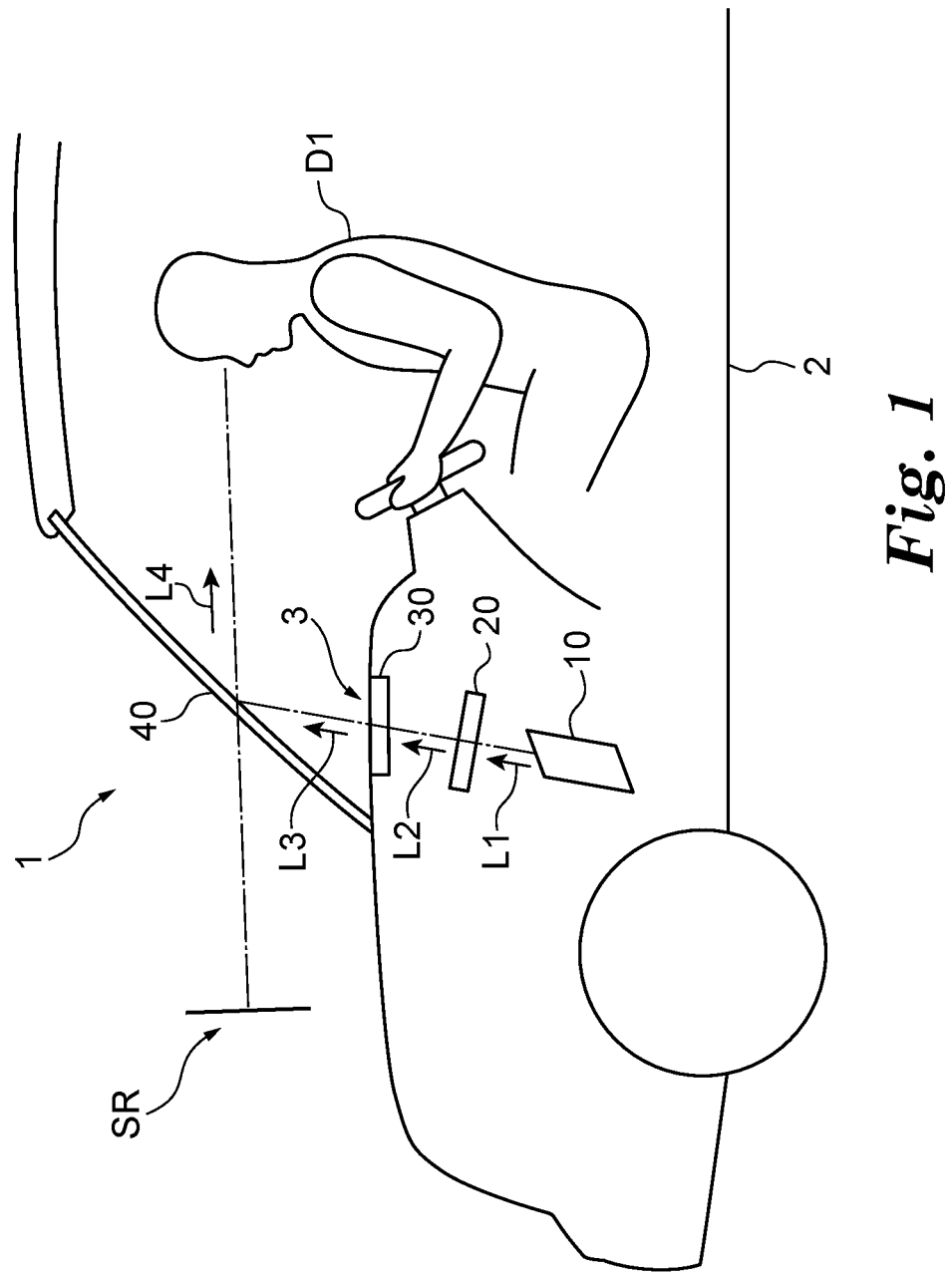
FIG. 1 is a diagram illustrating an example of a display device according to an embodiment of the present invention.

An embodiment of the present invention is a display device including a display unit emitting visible light of linearly polarized waves having display information, an infrared light-cutting section transmitting the visible light from the display unit and reducing an incident quantity of infrared light on the display unit, and a reflecting section reflecting visible light transmitted through the infrared light-cutting section; the infrared light-cutting section including a first polymer film and a second polymer film disposed on the first polymer film, the first polymer film and the second polymer film both having anisotropy of refractive indices and having a first axis having a highest of the refractive indices, the first axis of the first polymer film and the first axis of the second polymer film intersecting in a planar view.

According to this aspect, because at least one of the first polymer film and the second polymer film contained in the infrared light-cutting section reduces the incident quantity of infrared light on the display unit, the effect of thermal energy on the display unit due to light on the exterior of the display device, such as infrared light contained in sunlight, is reduced.

Furthermore, because the infrared light-cutting section transmits visible light which has display information, brightness of the display information is retained. Additionally, the first axis of the first polymer film contained in the infrared light-cutting section intersects the first axis of the second polymer film. For this reason, even if the first polymer film having anisotropy of refractive indices exhibits birefringence, that birefringence is generally compensated for by the second polymer film disposed on the first polymer film. Consequently, when visible light emitted from the display unit is transmitted through the infrared light-cutting section, the visible light greatly decreases the proportion changed from linearly polarized waves to elliptically polarized waves. As a result, visible light of elliptically polarized waves is reflected by a reflecting section such as a front windshield, and even if reflectance changes according to the polarized wave component, the proportion of elliptically polarized waves in the visible light transmitted through the infrared light-cutting section is small, and as a result, the display information perceived by the driver resembles the display information emitted from the display unit.

Note that "display information" in the present specification broadly encompasses information of which a certain meaning can be understood or recognized by viewing it; for example, in the case of a vehicle-mounted display device, it broadly encompasses maps, traffic signs, and other navigation information. "Reduces an incident quantity of infrared light on a display unit" means that it reduces the incident quantity of infrared light on the display unit by absorbing or reflecting infrared light. Furthermore, "anisotropy of refractive indices" means that, in a two-dimensional medium such as a polymer film, the refractive index differs depending on the direction in the two-dimensional plane; that is, the refractive index has anisotropy within a plane.

Embodiments of the display device and the infrared light-cutting film will be described in detail hereinafter with reference to the drawings. In this description, identical elements will be labeled with identical labels, and redundant descriptions thereof will be omitted.

FIG. 1 is a diagram illustrating an example of a display device according to an embodiment of the present invention. FIG. 1 illustrates an example in which the display device according to the present invention is used as a heads-up display for a vehicle. A display device 1 includes a light source 10, a display unit 20, an infrared light-cutting section 30, and a reflecting section 40 in a vehicle 2. The light source 10 includes, for example, a xenon lamp, a halogen lamp, a light emitting diode, or a cold cathode tube, and emits visible light L1 of linearly polarized waves toward the display unit 20. The display unit 20 includes, for example, a liquid crystal panel, an organic EL panel, a digital mirror device, a MEMS display, or a laser display, and has display information. The display unit 20 receives the visible light L1 from the light source 10, and emits visible light L2 of linearly polarized waves having display information toward the infrared light-cutting section 30. When the display unit 20 contains an organic EL panel, the display unit 20 and the light source 10 may be integrated, and therefore, the display unit 20 integrated with the light source 10 can emit visible light L2 toward the infrared light-cutting section 30.

The infrared light-cutting section 30 contains an infrared light-cutting film 3. The infrared light-cutting section 30 transmits the visible light L2 from the display unit 20, and after transmission, emits visible light L3 toward the reflecting section 40, and also reduces the incident quantity of infrared light on the display unit 20. The reflecting section 40 includes, for example, a front windshield, and reflects visible light L3 transmitted through the infrared light-cutting section 30 toward a driver D1. This reflected visible light L4 is received, and the driver D1 can view the display information at a position SR in addition to having a field of view of the front exterior of the vehicle 2 through the front windshield.

Figure 2A:
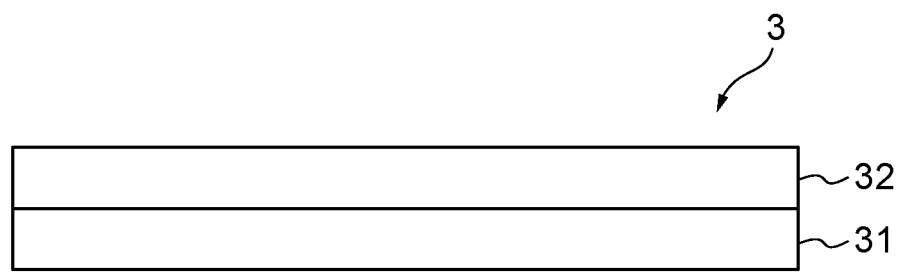
FIGS. 2A and 2B are diagrams illustrating an example of an infrared light-cutting film according to an embodiment of the present invention.
Figure 2B:

FIGS. 2A and 2B are diagrams illustrating an example of an infrared light-cutting film according to an embodiment of the present invention. The infrared light-cutting film 3 transmits visible light from one of its faces, and can reduce the incident quantity of infrared light from the other face. As illustrated in FIG. 2A, the infrared light-cutting film 3 has, for example, a first polymer film 31 and a second polymer film 32, and the second polymer film 32 may be disposed on the first polymer film 31.

The first polymer film 31 and the second polymer film 32 may be a single-layer polymer film or a multilayer polymer film. When at least one of the first polymer film 31 and the second polymer film 32 is a single-layer polymer film, that single-layer polymer film may contain, for example, polyethylene terephthalate (PET), polyethylene naphthalate (PEN), acrylic resin, polycarbonate resin, olefin resin, or polyimide resin, and has a thickness of, for example, from 50 to 200 μm.

When at least one of the first polymer film 31 and the second polymer film 32 is a multilayer polymer film as illustrated in FIG. 2B, that multilayer polymer film may have a structure in which first polymer layers 51 and second polymer layers 52 are alternately laminated.

The first polymer layer 51 contains, for example, a crystalline, semi-crystalline, or liquid crystal polymer or copolymer, or the like. The average thickness of the first polymer layer 51 is, for example, not greater than 0.5 μm.

Examples of preferred materials contained in the first polymer layer 51 include polyethylene naphthalate (PEN) of naphthalene dicarboxylic acid polyesters and isomers thereof (e.g., 2,6-, 1,4-, 1,5-, 2,7-, and 2,3-PEN), polybutylene naphthalate, polyalkylene terephthalates (e.g., polyethylene terephthalate, polybutylene terephthalate, and poly-1, 4-cyclohexane dimethylene terephthalate), polyimides (e.g., polyacrylic imide), polyetherimide, atactic polystyrene, polycarbonate, polymethacrylates (e.g., polyisobutyl methacrylate, polypropyl methacrylate, polyethyl methacrylate, and polymethyl methacrylate), polyacrylates (e.g., polybutylacrylate and polymethylacrylate), syndiotactic polystyrene (sPS), syndiotactic poly-a-methylstyrene, syndiotactic polydichlorostyrene, copolymers and blends made from any polystyrene thereof, cellulose derivatives (e.g., ethylcellulose, cellulose acetate, cellulose propionate, cellulose acetate butyrate, and nitrocellulose), polyalkylene polymers (e.g., polyethylene, polypropylene, polybutylene, polyisobutylene, and poly(4-methyl)pentene), fluorinated polymers (e.g., perfluoroalkoxy resin, polytetrafluoroethylene, fluorinated ethylene-propylene copolymer, polyvinylidene fluoride, and polychlorotrifluoroethylene), chlorinated polymers (e.g., polyvinylidene chloride and polyvinyl chloride), polysulfone, polyether sulfone, polyacrylonitrile, polyamide, silicone resin, epoxy resin, polyvinyl acetate, polyether amide, ionomer resin, elastomers (e.g., polybutadiene, polyisoprene, and neoprene), and polyurethane.

Examples of preferred other materials contained in the first polymer layer 51 include copolymers such as coPEN, i.e., PEN copolymers (e.g., copolymers of 2,6-, 1,4-, 1,5-, 2,7-, and/or 2,3-naphthalene dicarboxylic acid or esters thereof with (a) terephthalic acid or esters thereof, (b) isophthalic acid or esters thereof, (c) phthalic acid or esters thereof, (d) alkane glycols, (e) cycloalkane glycols (e.g., cyclohexane dimethanol diol), (f) alkane dicarboxylic acids, and/or (g) cycloalkane dicarboxylic acids (e.g., cyclohexane dicarboxylic acid)), polyalkylene terephthalate copolymers (e.g., copolymers of terephthalic acid or esters thereof with (a) naphthalene dicarboxylic acid or esters thereof, (b) isophthalic acid or esters thereof, (c) phthalic acid or esters thereof, (d) alkane glycols, (e) cycloalkane glycols (e.g., cyclohexane dimethanol diol), (f) alkane dicarboxylic acids, and/or (g) cycloalkane dicarboxylic acids (e.g., cyclohexane dicarboxylic acid)), styrene copolymers (e.g., styrene-butadiene copolymer and styrene-acrylonitrile copolymer), and copolymer of 4,4'-dibenzoic acid and ethylene glycol.

The first polymer layer 51 may also include a blend of two or more of the above polymers or copolymers (e.g., a blend of sPS and atactic polystyrene). Furthermore, coPEN may be a blend of pellets, and may be a polymer in which at least one component uses naphthalene dicarboxylic acid as a substrate and the other components are other polyesters or polycarbonates such as PET, PEN or coPEN.

PEN is particularly preferred as a material included in the first polymer layer 51, and it is stable against heat from approximately 155° C. to approximately 230° C. Other than PEN, particularly preferred examples include polybutylene naphthalate and other crystalline naphthalene dicarboxylic acid polyesters.

In the first polymer layer 51, a small amount of comonomer may be substituted in the naphthalene dicarboxylic acid polyester within a range that does not substantially change the refractive index thereof. Examples of advantageous monomers include those based on isophthalic acid, azelaic acid, adipic acid, sebacic acid, dibenzoic acid, terephthalic acid, 2,7-naphthalene dicarboxylic acid, 2,6-naphthalene dicarboxylic acid, and cyclohexane dicarboxylic acid. When a small amount of comonomer is substituted in the naphthalene dicarboxylic acid polyester, the refractive index sometimes decreases. However, even if the refractive index decreases, it may be compensated for by bonding with certain polymer layers, a decrease in the extrusion temperature during film production, an improvement in melt viscosity matching, and an improvement in glass transition temperature matching for film stretching during film production.

The second polymer layer 52 may contain, for example, polyethylene terephthalate (PET) or coPEN. The average thickness of the second polymer layer 52 is, for example, not greater than 0.5 μm, and the difference in refractive index between the resin contained in the first polymer layer 51 and the resin contained in the second polymer layer 52 should be not less than 0.03.

It is preferred that the material contained in the first polymer layer 51 and the material contained in the second polymer layer 52 have similar melt viscosity to enable uniform multilayer extrusion during the production thereof. The material included in the first polymer layer 51 preferably has a melt viscosity within 5 times that of the material contained in the second polymer layer 52 at a typical shearing speed during extrusion. The first polymer layer 51 and the second polymer layer 52 may exhibit adhesion to each other well, while on the other hand, they may be present as individual layers in a multilayer polymer film.

Furthermore, it is preferred that the material contained in the first polymer layer 51 and the material contained in the second polymer layer 52 have approximately equal glass transition temperatures. In this case, neither of the polymer layers cracks easily even when the film is stretched during production.

Approximately equal glass transition temperatures means that the glass transition temperature of the material contained in the second polymer layer is lower than the glass transition temperature of the material contained in the second polymer layer. The glass transition temperature of the material contained in the second polymer layer may be slightly higher than the glass transition temperature of the material contained in the first polymer layer, but it is preferred that the difference in those temperatures be not greater than 40° C.

The number of each layer contained in a multilayer polymer film may be selected so as to achieve desired optical properties with the smallest number of layers, based on the thickness, flexibility, and economical viability of the multilayer polymer film and the like. The number of each layer is preferably less than approximately 10,000, more preferably less than approximately 5,000, and even more preferably less than approximately 2,000.

In the present embodiment, the method for disposing the second polymer film 32 on the first polymer film 31 may be a conventional known method without particular limitation. As one such method, each film may be disposed securely using an adhesive. Specifically, a pressure-sensitive adhesive, a hot melt adhesive, an active energy ray-curable adhesive, a moisture-curable adhesive, a thermosetting adhesive, an anaerobic adhesive, and the like may be used, and the type may be decided as appropriate according to the materials and the like of the polymer films. For example, acrylic-based, vinyl alcohol-based, silicone-based, polyester-based, polyurethane-based, polyether-based adhesives and the like may be used, and high-transparency adhesives may be used. These adhesives may be applied as is to the surface of each of the polymer films, or a layer such as a tape or sheet constituted of an adhesive may be applied to some or all of the surface of the polymer films. Furthermore, as another method of disposing the second polymer film on the first polymer film, a frame that can at least partially surround the edges of each of the polymer films is prepared, and the first polymer film and second polymer film are layered and disposed securely in that frame.

Figure 3A:
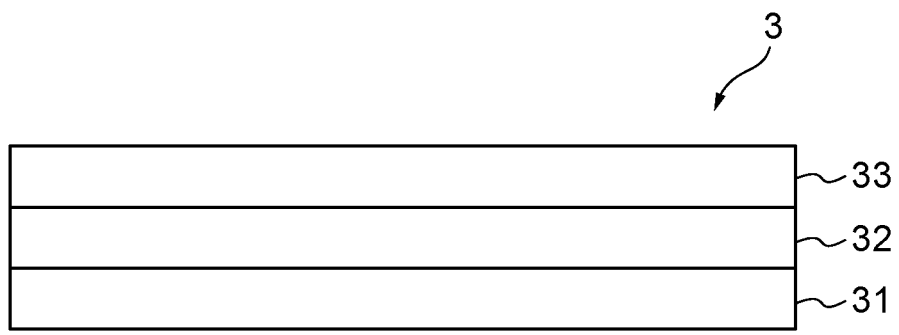
FIGS. 3A and 3B are diagrams illustrating an example of an infrared light-cutting film according to an embodiment of the present invention.
Figure 3B:
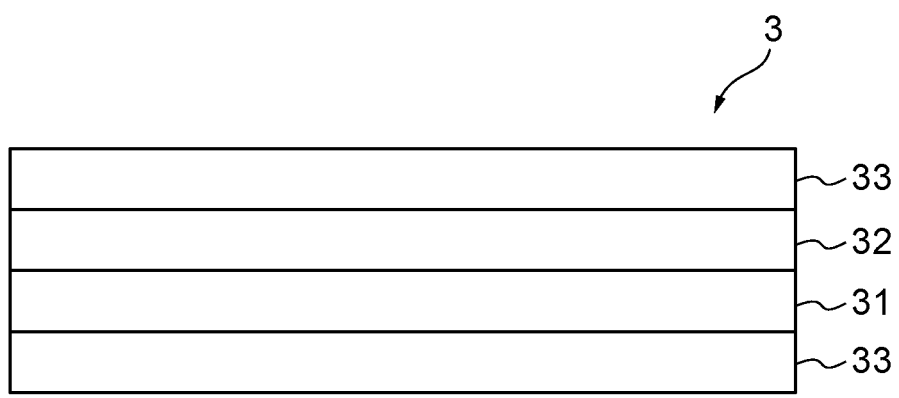

FIGS. 3A and 3B are diagrams illustrating an example of the infrared light-cutting film according to an embodiment. As illustrated in FIGS. 3A and 3B, an infrared light-cutting film 3 as an example has an infrared light-cutting layer 33 laminated on at least one of the first polymer film 31 and the second polymer film 32. The infrared light-cutting layer 33 decreases the transmitted quantity of infrared light.

As illustrated in FIG. 3A, the infrared light-cutting layer 33 may be laminated on either one of the first polymer film 31 or the second polymer film 32, for example, on the second polymer film 32. Furthermore, as illustrated in FIG. 3B, the infrared light-cutting film 3 may have an infrared light-cutting layer 33 laminated on both the first polymer film 31 and the second polymer film 32. Note that in the example illustrated in FIG. 3B, the first polymer film 31 and the second polymer film 32 contact each other, and infrared light-cutting layers 33 are laminated on the respective sides opposite the contact surface of the first polymer film 31 and the second polymer film 32. However, the configuration is not limited to the above example, and the infrared light-cutting layer 33 may also be disposed in between the first polymer film 31 and the second polymer film 32. The infrared light-cutting section 30 can have the same optical properties in either configuration.

The infrared light-cutting layer 33 contains, for example, metals, metal alloys, or oxide semiconductors, and primarily reflects light in the infrared region and light in the near-infrared region of wavelengths not less than 1 μm. Examples of the metals include silver, gold, copper, an aluminum. Silver is a particularly preferred metal because it is easy to form into a thin film and readily reflects light in the infrared and near infrared regions. The metal alloys include silver alloys, stainless steel, and inconel. Among the metal alloys, silver alloys containing at least 30 wt. % of silver are particularly preferred because they easily form a thin film and readily reflect light in the infrared and near infrared regions. Silver alloys containing silver and less than 50 mass % of gold and/or less than 20 mass % of copper are preferred materials because they have excellent durability. Examples of the oxide semiconductors include tin dioxide ($SnO_2$), zinc oxide (ZnO), and indium tin oxide (ITO), among which ITO is preferred. The metal, metal alloy, or oxide semiconductor may form a single layer or may form a plurality of layers.

The infrared light-cutting layer 33 is formed by, for example, thermal decomposition, powder coating, vapor deposition, cathode sputtering, ion plating, or the like, and the metal, oxide semiconductor, or metal alloy is formed on a polymer film. Cathode sputtering and ion plating are preferred production methods because a uniform film structure and thickness are obtained. The infrared light-cutting layer 33 may also be another metallized polymer or a glass sheet laminated on a multilayer polymer film using an adhesive. Examples of the adhesive include hot melt adhesives (e.g., VITEL 3300 adhesive, obtainable from Shell Chemical Company, 4040 Embassy Parkway, Akron, Ohio 44333) and pressure-sensitive adhesives (e.g., acrylic adhesives 90/10 IOA/AA and 95/5 IOA/acrylamide, obtainable from 3M Company, St. Paul, Minn. 55144).

The metal or metal alloy may be applied in a thickness of from approximately 10 nm to approximately 40 nm, and preferably from approximately 12 nm to approximately 30 nm. The oxide semiconductor may be applied in a thickness of from approximately 20 nm to approximately 200 nm, and preferably from approximately 80 nm to approximately 120 nm. When the infrared light-cutting layer 33 is a metallized polymer or a glass sheet laminated on a multilayer polymer film, the thickness of the metal or metal alloy coating on the sheet is, for example, from approximately 10 nm to approximately 40 nm, and the thickness of the oxide semiconductor coating is, for example, from approximately 20 nm to approximately 200 nm.

Since the infrared light-cutting film 3 according to the present embodiment has an infrared light-cutting layer 33, when it is used as an infrared light-cutting section 30, it can reduce the incident quantity of infrared light on the display unit 20. Specifically, the infrared light-cutting film 3 used as the infrared light-cutting section 30 has a display unit 20 side and a reflecting section 40 side opposite the display unit 20 side. The effect of thermal energy on the display unit due to external light, e.g., infrared light in sunlight, incident on the reflecting section 40 face is reduced by the infrared light-cutting film 3. Furthermore, because the infrared light-cutting section 30 transmits visible light having display information, brightness of the display information is retained. Note that in the present embodiment, a mode having an infrared light-cutting layer 33 was described, but in the case where at least one of the first polymer film 31 and the second polymer film 32 is a multilayer polymer film, the incident quantity of infrared light on the display unit 20 can be reduced even if there is no infrared light-cutting layer 33 provided, although there is a certain degree of difference.

In the production process of the first polymer film 31 and the second polymer film 32, these films may be formed by simultaneously extruding the polymer material contained in the films, in both single-layer and multilayer films. In the film production process, film orientation treatment is then performed by stretching at a prescribed temperature, and a film having a desired thickness is formed. Thermosetting treatment at a prescribed temperature is performed as necessary. The extrusion treatment and the orientation treatment may be performed simultaneously.

The first polymer film 31 and the second polymer film 32 have a first axis having the highest of the refractive indices. When the film is produced, when the film is stretched only in one direction (uniaxial orientation), that stretching direction serves as the first axis Ax1. When the film is produced, when the film is stretched in two directions (biaxial orientation), either of the two stretching directions serves as the first axis Ax1.

Note that in the case of a polymer film produced by stretching, anisotropy of the refractive indices arises in the film and birefringence is exhibited. For this reason, when an infrared light-cutting film is produced by laminating an infrared light-cutting layer on a single polymer film and this infrared light-cutting film is used as the infrared light-cutting section, when visible light of linearly polarized waves is transmitted through the infrared light-cutting film, it sometimes changes from linearly polarized waves to elliptically polarized waves. In this case, when the visible light of elliptically polarized waves is reflected by a front windshield, the reflectance of the visible light changes according to the polarized wave component, and as a result, the display information (display information contained in the reflected visible light) perceived by the driver may degrade in visibility and end up differing from the display information that was emitted from the display unit.

On the other hand, in the present embodiment, rather than using a single polymer film, the infrared light-cutting film 3 in which the second polymer film 32 is disposed on the first polymer film 31 is used as the infrared light-cutting section 30. Additionally, in a planar view, the first axis Ax1 of the first polymer film 31 and the first axis Ax1 of the second polymer film 32 intersect in the infrared light-cutting section 30.

For this reason, even if the first polymer film 31 having anisotropy of refractive indices exhibits birefringence, that birefringence is generally compensated for by the second polymer film 32 disposed on the first polymer film 31. Consequently, when visible light L2 emitted from the display unit 20 is transmitted through the infrared light-cutting section 30, the visible light L2 greatly decreases the proportion changed from linearly polarized waves to elliptically polarized waves. As a result, visible light L3 of elliptically polarized waves is reflected by a reflecting section 40 such as a front windshield, and even if reflectance changes according to the polarized wave component, the proportion of elliptically polarized waves in the visible light L3 transmitted through the infrared light-cutting section 30 is small, and as a result, the display information perceived by the driver D1 resembles the display information emitted from the display unit 20.

Figure 4:
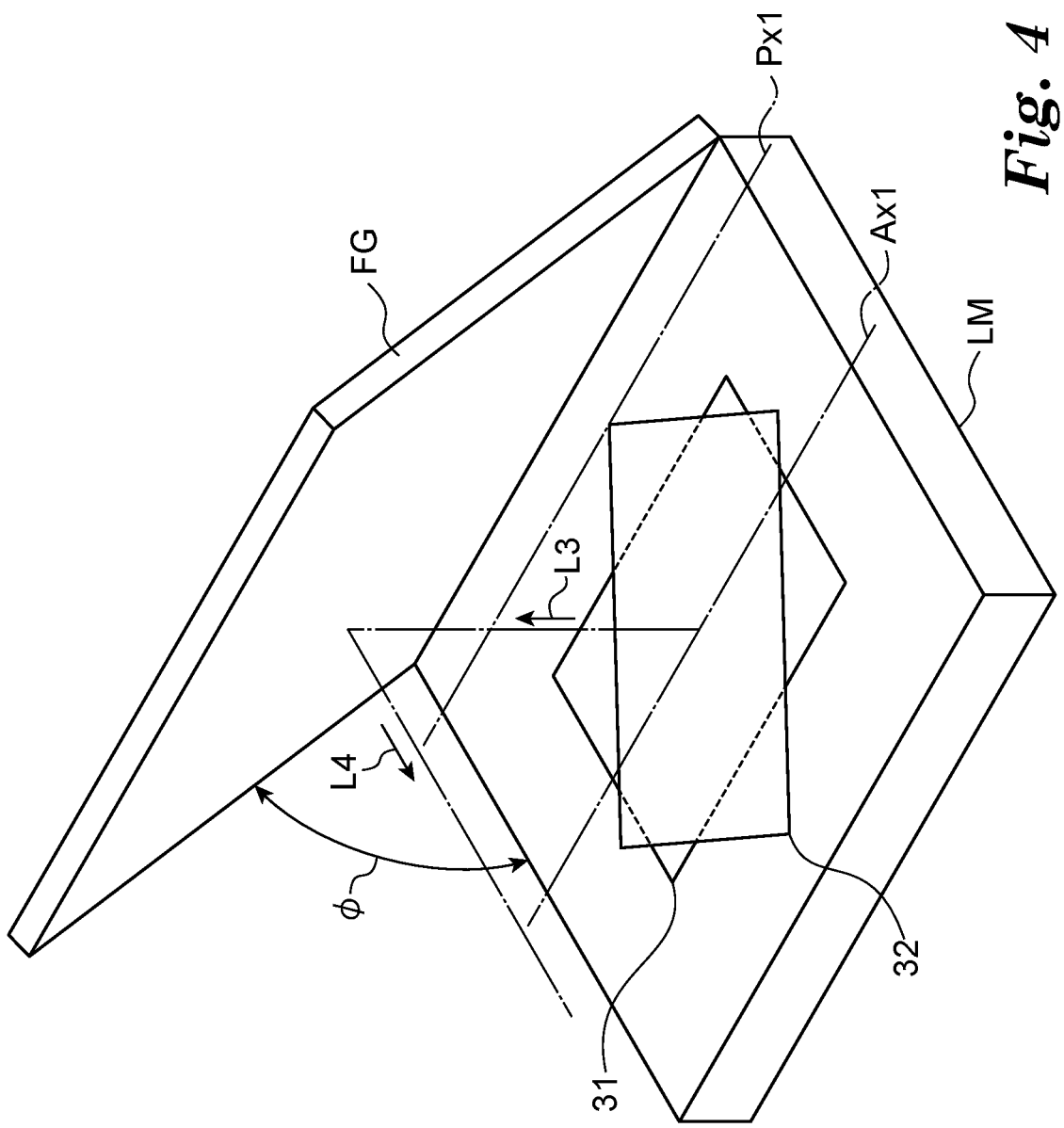
FIG. 4 is a schematic view illustrating a measurement system to examine the state of polarization of visible light of linearly polarized waves passing through an infrared light-cutting section.

FIG. 4 is a schematic view illustrating a measurement system to examine the state of polarization of visible light of linearly polarized waves passing through an infrared light-cutting section 30. In this measurement system, a liquid crystal monitor LM (15-inch TN color liquid crystal monitor, DuraVision FDX1503 manufactured by EIZO Inc.) is used as the light source 10 and the display unit 20, and float plate glass FG is used as the reflecting section 40. The float plate glass FG is substantially transparent in the visible range, and its thickness is approximately 1 mm. The angle of incidence φ of visible light L3 on the reflecting section 40 is approximately 45 degrees. The angle of reflection of visible light L4 on the observer, equivalent to the driver D1, is also 45 degrees, and the observer can view the reflecting section 40 on the front surface thereof.

In this measurement system, the multilayer polymer film containing the first polymer film 31 and the second polymer film 32 is used as the infrared light-cutting film 3. The first polymer film 31 and the second polymer film 32 are both 3M™ Scotchtint™ Window Film Multilayer NANO90S (manufactured by 3M Company). The size of the polymer film is approximately 20 cm×30 cm, and the adhesive layer and surface hard coat layer are removed from the NANO90S polymer film. The first polymer film 31 and the second polymer film 32 both have 200 or more layers.

The liquid crystal monitor LM emits visible light L2 of linearly polarized waves toward the float plate glass FG as the reflecting section 40. The polarization direction of the emitted visible light L2 runs substantially along the polarization direction Px1 of the liquid crystal monitor. In measurement performed to examine the state of polarization, the first polymer film 31 is mounted on the liquid crystal monitor LM, and the second polymer film 32 is mounted on the first polymer film 31. The angle formed by the polarization direction Px1 and the first axis Ax1 of the first polymer film 31 is approximately 0 degrees.

Figure 5:
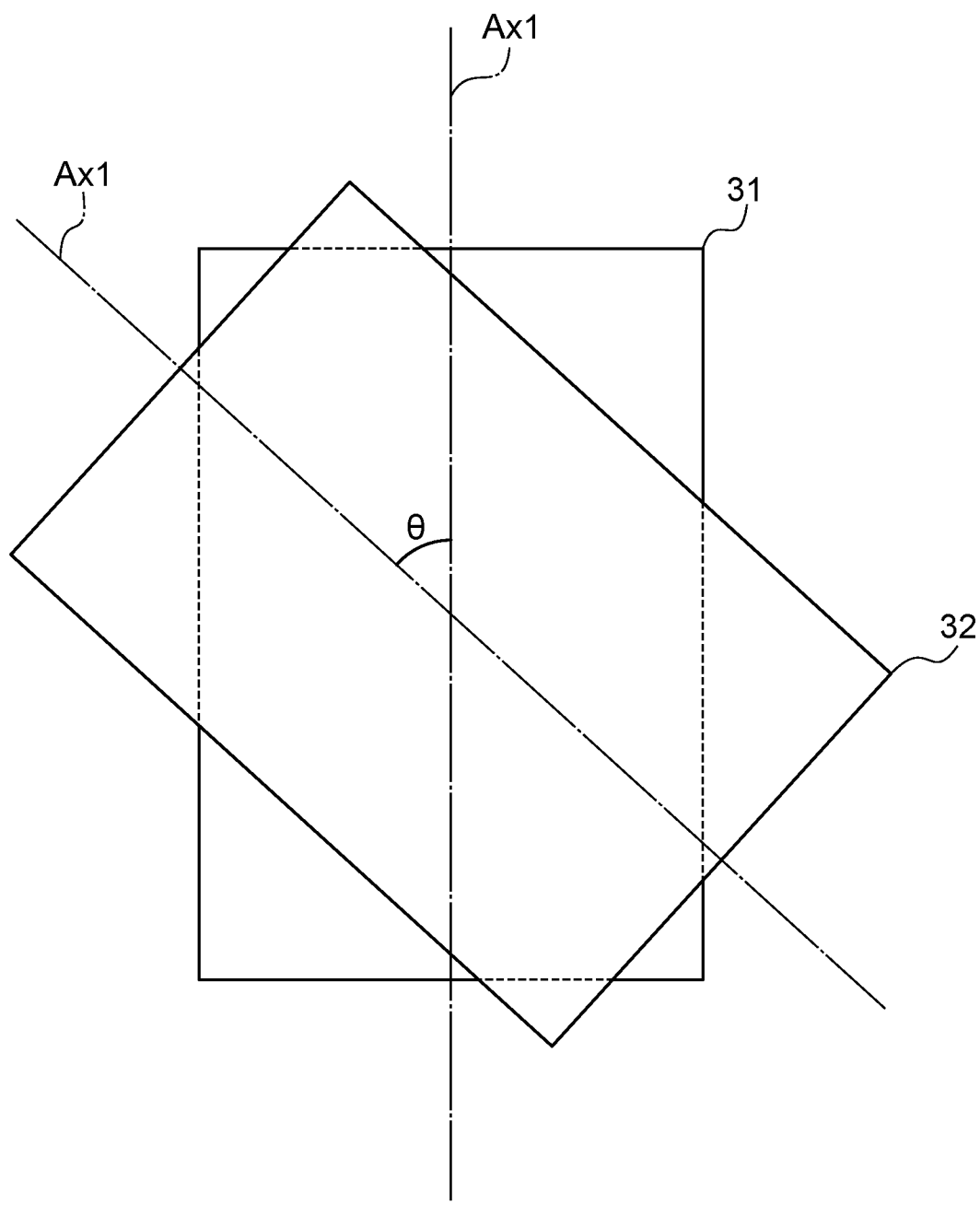
FIG. 5 is a diagram illustrating an intersection angle of a first axis of a first polymer film and a first axis of a second polymer film.

FIG. 5 is a diagram illustrating an intersection angle of a first axis of a first polymer film and a first axis of a second polymer film. In measurement performed to examine the state of polarization, first, visible light from the liquid crystal monitor LM was observed with the intersection angle θ set to 0 degrees. An iridescent iris pattern was seen in the visible light L4 reflected by the float plate glass FG. This result means that the portion of the linearly polarized waves of the visible light L3 that pass through the first polymer film 31 having anisotropy of refractive indices changes to elliptically polarized waves due to birefringence of the first polymer film 31, and additionally, a portion of the elliptically polarized waves thereof remained as elliptically polarized waves without being fully compensated for by the birefringence of the second polymer film 32. The visible light L3 transmitted through the infrared light-cutting section 30 includes elliptically polarized waves, and furthermore, the reflectance of each polarization component of the elliptically polarized waves differs when reflected by the float plate glass FG. As a result, the visible light L4 is seen as an iridescent iris pattern. When the intersection angle θ is 0 degrees, the color seen from the visible light L4 after being reflected by the float plate glass FG differs from the color seen from the visible light L3 before being reflected.

Next, visible light L4 from the liquid crystal monitor LM was observed with the intersection angle θ set to 45 degrees. It was improved such that, in the visible light L4 reflected by the float plate glass FG, iridescence became weaker and a pale blue or pale yellow color was seen. The fact that it changed from an iridescent iris pattern to a pale blue or pale yellow color means that the proportion of elliptically polarized waves in the visible light L3 was lower than when the intersection angle θ was 0 degrees.

In measurement with the intersection angle θ set to 75 degrees, it was confirmed that the coloring of the visible light L4 decreased greatly when an observer observed the visible light L4 reflected from the float plate glass FG. This means that the proportion of elliptically polarized waves in the visible light L3 at the level of observation by an observer decreased to an extent that increased coloring did not appear relative to the color seen by the observer. The results of measurement performed for examining the state of polarization demonstrated that as the intersection angle θ increases from 45 degrees to 90 degrees, the elliptically polarized waves occurring due to the birefringence of the first polymer film 31 are compensated for by the birefringence of the second polymer film 32, and the proportion of linearly polarized waves in the visible light L3 increases.

When the intersection angle θ is from 45 degrees to 90 degrees, and more preferably from 75 degrees to 90 degrees, even if the first polymer film 31 having anisotropy of refractive indices exhibits birefringence, that birefringence can generally be compensated for by the second polymer film 32 disposed on the first polymer film 31. For this reason, after visible light L2 emitted from the display unit 20 is transmitted through the infrared light-cutting section 30, it greatly decreases the proportion changed from linearly polarized waves to elliptically polarized waves. As a result, visible light L3 of elliptically polarized waves is reflected by the reflecting section 40 such as a front windshield, and even if reflectance differs according to the polarized wave component, the proportion of elliptically polarized waves in the visible light L3 transmitted through the infrared light-cutting section 30 is small, and as a result, the display information perceived by the observer resembles the display information emitted from the display unit 20.

The present embodiment shows an example in which birefringence in the first polymer film is compensated for by disposing only one second polymer film 32 on the first polymer film 31, but a plurality of second polymer films 32 may be used as necessary.

REFERENCE SIGNS LIST

1 Display device
10 Light source
20 Display unit
21 Infrared light-cutting film
30 Infrared light-cutting section
31 First polymer film
32 Second polymer film 33 Infrared light-cutting layer
40 Reflecting section
Ax1 First axis
L1, L2, L3, L4 Visible light

The invention claimed is:

1. A display device comprising:
a display unit emitting visible light of linearly polarized waves having display information,
an infrared light-cutting section transmitting the visible light from the display unit and reducing an incident quantity of infrared light on the display unit, and
a reflecting section reflecting the visible light transmitted through the infrared light-cutting section;
the infrared light-cutting section comprising a first polymer film and a second polymer film disposed on the first polymer film,
the first polymer film and the second polymer film both having anisotropy of refractive indices and having a first axis having a highest of the refractive indices,
the first axis of the first polymer film and the first axis of the second polymer film intersecting in a planar view, such that when polarized visible light is incident on the first polymer film side of the infrared light-cutting section, the first polymer film transmits the incident light as a first elliptically polarized light incident on the second polymer film, the second polymer film transmits the incident first elliptically polarized light as a second elliptically polarized light having reduced ellipticity compared to the first elliptically polarized light.

2. The display device according to claim 1, wherein the first polymer film and the second polymer film both comprise a multilayer polymer film.

3. The display device according to claim 1, wherein an intersection angle between the first axis of the first polymer film and the first axis of the second polymer film is from 45 to 90 degrees.

4. The display device according to claim 1, wherein the infrared light-cutting section comprises an infrared light-cutting layer laminated on at least one of the first polymer film and the second polymer film, the layer reducing the transmitted quantity of infrared light.

5. An infrared light-cutting film transmitting visible light from one face and reducing an incident quantity of infrared light from another face,
the infrared light-cutting film comprising:
a first polymer film having anisotropy of refractive indices,
a second polymer film having anisotropy of refractive indices and disposed on the first polymer film,
the first polymer film and the second polymer film both having a first axis having a highest of the refractive indices,
the first axis of the first polymer film and the first axis of the second polymer film intersecting in a planar view, such that when polarized visible light is incident on the first polymer film side of the infrared light-cutting film, the first polymer film transmits the incident light as a first elliptically polarized light incident on the second polymer film, the second polymer film transmits the incident first elliptically polarized light as a second elliptically polarized light having reduced ellipticity compared to the first elliptically polarized light.

* * * * *